United States Patent
El Zur et al.

(10) Patent No.: US 7,852,856 B2
(45) Date of Patent: *Dec. 14, 2010

(54) SYSTEM AND METHOD FOR PROVIDING POOLING OR DYNAMIC ALLOCATION OF CONNECTION CONTEXT DATA

(75) Inventors: Uri El Zur, Irvine, CA (US); Steven B. Lindsay, Mission Viejo, CA (US); Kan Frankie Fan, Diamond Bar, CA (US); Scott S. McDaniel, Villa Park, CA (US)

(73) Assignee: Broadcom Corp.

( * ) Notice: Subject to any disclaimer, the term of this patent is extended or adjusted under 35 U.S.C. 154(b) by 1587 days.

This patent is subject to a terminal disclaimer.

(21) Appl. No.: 11/015,444

(22) Filed: Dec. 17, 2004

(65) Prior Publication Data

US 2005/0105531 A1     May 19, 2005

Related U.S. Application Data

(63) Continuation-in-part of application No. 10/652,327, filed on Aug. 29, 2003.

(60) Provisional application No. 60/531,080, filed on Dec. 19, 2003.

(51) Int. Cl.
*H04L 12/28* (2006.01)
*H04L 12/56* (2006.01)

(52) U.S. Cl. .................................................. 370/395.5

(58) Field of Classification Search ................ 370/395, 370/389, 401, 469, 466, 412, 463, 406, 428, 370/465, 470, 429, 328, 338, 235, 231, 321, 370/399, 356; 709/224, 250, 217, 318, 212, 709/230, 203, 223, 245, 238, 225, 213, 466, 709/226, 242, 206, 251, 234, 201, 236; 713/151–153, 713/193, 189, 174; 710/68, 5; 700/1; 711/131; 375/144; 704/9, 10; 455/410
See application file for complete search history.

(56) References Cited

U.S. PATENT DOCUMENTS

| | | | | |
|---|---|---|---|---|
| 6,018,779 A * | 1/2000 | Blumenau | ..................... | 710/68 |
| 6,611,522 B1 * | 8/2003 | Zheng et al. | ........... | 370/395.21 |
| 6,687,254 B1 * | 2/2004 | Ho et al. | ..................... | 370/412 |
| 6,920,562 B1 * | 7/2005 | Kerr et al. | ................... | 713/189 |
| 7,174,394 B1 * | 2/2007 | Garner et al. | .................. | 710/5 |
| 7,269,666 B1 * | 9/2007 | Leitner et al. | ............... | 709/250 |
| 7,539,204 B2 * | 5/2009 | Shalom et al. | .............. | 370/428 |
| 7,586,925 B2 * | 9/2009 | Smith et al. | ................. | 370/399 |
| 2001/0037406 A1 * | 11/2001 | Philbrick et al. | ............ | 709/250 |

(Continued)

*Primary Examiner*—Pankaj Kumar
*Assistant Examiner*—Prenell P Jones
(74) *Attorney, Agent, or Firm*—McAndrews, Held & Malloy, Ltd.

(57) ABSTRACT

A method and system for providing pooling or dynamic allocation of connection context data may comprise receiving data associated with a first network protocol and receiving data associated with a second network protocol. A single shared context memory may be utilized for processing at least some of the data associated with the first network protocol and at least some of the data associated with the second network protocol. At least a portion of the received data associated with the first and/or second network protocols may be offloaded for processing in the single context memory. The received data associated with a first and/or second network protocols may comprise traffic data and control data. Portions of the shared single context memory may be dynamically allocated and/or reallocated for processing received data associated with the first and second network protocols.

49 Claims, 5 Drawing Sheets

U.S. PATENT DOCUMENTS

| | | | |
|---|---|---|---|
| 2002/0071450 A1* | 6/2002 | Gasbarro et al. | 370/463 |
| 2003/0005174 A1* | 1/2003 | Coffman et al. | 709/318 |
| 2003/0050990 A1* | 3/2003 | Craddock et al. | 709/212 |
| 2004/0010545 A1* | 1/2004 | Pandya | 709/203 |
| 2004/0010612 A1* | 1/2004 | Pandya | 709/230 |
| 2004/0030757 A1* | 2/2004 | Pandya | 709/217 |
| 2004/0030770 A1* | 2/2004 | Pandya | 709/223 |
| 2004/0037299 A1* | 2/2004 | Pandya | 370/401 |
| 2004/0037319 A1* | 2/2004 | Pandya | 370/469 |
| 2004/0049580 A1* | 3/2004 | Boyd et al. | 709/226 |
| 2004/0049600 A1* | 3/2004 | Boyd et al. | 709/250 |
| 2004/0071148 A1* | 4/2004 | Ozaki et al. | 370/401 |
| 2004/0093411 A1* | 5/2004 | Elzur et al. | 709/224 |
| 2004/0208197 A1* | 10/2004 | Viswanathan | 370/466 |
| 2004/0210320 A1* | 10/2004 | Pandya | 700/1 |
| 2004/0250095 A1* | 12/2004 | Feldman | 713/191 |
| 2005/0055406 A1* | 3/2005 | Singhai et al. | 709/206 |
| 2006/0007926 A1* | 1/2006 | Zur et al. | 370/389 |
| 2006/0136570 A1* | 6/2006 | Pandya | 709/217 |

* cited by examiner ial allocation of connection context data. -->

SYSTEM AND METHOD FOR PROVIDING POOLING OR DYNAMIC ALLOCATION OF CONNECTION CONTEXT DATA

CROSS-REFERENCE TO RELATED APPLICATIONS/INCORPORATION BY REFERENCE

This application is a continuation-in-part of U.S. application Ser. No. 10/652,327, filed Aug. 29, 2003.

This application make reference to, claims priority to, and claims the benefit of U.S. Provisional Application Ser. No. 60/531,080, filed Dec. 19, 2003.

This application also makes reference to U.S. application Ser. No. 10/652,330, filed on Aug. 29, 2003.

All of the above-referenced applications are hereby incorporated herein by reference in their entirety.

FIELD OF THE INVENTION

Certain embodiments of the invention relate to network interfaces. More specifically, certain embodiments of the invention relate to a method and system for providing pooling or dynamic allocation of connection context data.

BACKGROUND OF THE INVENTION

FIG. 1 shows a server 100 adapted to handle five types of network traffic. The first type of network traffic is typical network traffic such as, for example, common Ethernet network traffic including Internet protocol (IP) or other layer 3 (L3) technologies transporting small amounts of data and control information around the network and/or larger amounts of data on behalf of Transport protocols like UDP or TCP. The first type of network traffic is handled by a first network traffic system including an Ethernet connector 110; a layer 2 (L2) network interface card (NIC) arrangement 120 including an L2 NIC 130; a peripheral component interconnect (PCI) bridge 140; an L2 NIC driver 150; a full-feature software transmission control protocol (TCP) stack 160; a socket service switch 170; and a socket service 180. The full-feature software TCP stack 160 supports socket services as well as other services.

The second type of network traffic is TCP accelerated traffic such as, for example, TCP running on top of IP. The protocol is used to move large data across conventional Ethernet networks. The server 100 may offload the TCP portion of the network traffic, thereby freeing server resources for running non-networking tasks. The second type of network traffic is handled by a second network traffic system including a TCP offload engine (TOE) that accelerates TCP traffic. The second network traffic system includes an Ethernet connector 190; a layer 4 (L4) offload adapter arrangement 200 including an L2 NIC 210 and a TCP processor 220; the PCI bridge 140; an L4 driver 230; the socket service switch 170; and the socket service 180. The TCP accelerated traffic is typically serviced by the socket service 180.

The third type of network traffic is storage traffic. Conventional storage systems use small computer system interface (SCSI) directly attached or carried over transports such as Fibre Channel technologies to connect the server 100 to storage disks. Both of these technologies share a common command set e.g. SPC-2 ans common software interface or service, e.g. a SCSI port filter driver in Windows operating systems. Recently, a protocol has been developed that provides SCSI traffic to be run over a TCP/IP network. The recent protocol removes the need for SCSI or Fibre Channel network connections, thereby allowing the storage traffic to be run over the same network as used for networking (e.g., Ethernet). The third type of network traffic is handled by a third network traffic system including an adapter that implements the recent protocol and provides SCSI miniport service. The third network traffic system includes an Ethernet connector 240; a storage host bus adapter (HBA) arrangement 250 including an L2 NIC 260, a TCP processor 270 and an Internet SCSI (iSCSI) processor 280; the PCI bridge 140; a SCSI driver 290; and a SCSI miniport service 300.

The fourth type of network traffic is interprocess communication (IPC) traffic or high performance computing (HPC). This type of network allows programs running on different servers to communicate quickly and with very low overhead. IPC networks are used with, for example, distributed applications, database servers and file servers. For example, IPC networks can be used when the computing power needed exceeds the capacity of a particular server such that several servers are clustered to perform the task or when multiple servers are used for ultra-reliable operation. This type of service is provided through a remote direct memory access (RDMA) interface (e.g., Winsock Direct for a Microsoft operating system and other interfaces for other OS) that directly interfaces with applications. The fourth type of network traffic is handled by a fourth network traffic system including an adapter that provides services as a dedicated, proprietary network (e.g., Infiniband products). The fourth network traffic system includes a proprietary network interface 310; an RDMA NIC arrangement 320 including an L2 NIC adapted for the particular network 330, an L4 processor 340 and an RDMA processor 345; the PCI bridge 140; an RDMA driver 350; and an RDMA service 360 (e.g., Winsock Direct).

The fifth type of network traffic is any traffic relating to any type of operating system (OS) Agnostic Management Entity or device. These entities or devices monitor the state of the server 100 and transmit information relating to state and statistical values over the network or other types of information such as information targeted to a computer display. The fifth type of network traffic is handled by a fifth network traffic system that includes an Ethernet connector 370; a server management agent 380; and optionally a keyboard/video/mouse service 390. The fifth network traffic system provides keyboard, video and mouse hardware services to the server 100 so that these interfaces can be redirected over the network to a central server management system.

The five network traffic systems supported by the server 100 use a substantial amount of space within the server and are typically quite costly. Combining the five types of networks is hindered on a number of fronts. For example, many operating systems insist that each connector have its own driver and its own hardware. Accordingly, each of the five network traffic systems has its own data and control paths. Furthermore, the use of proprietary network interfaces minimizes the possibility of integration and common and easy management of the server resources. Thus, a number of hardware and software redundancies and inefficiencies remain.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for providing pooling or dynamic allocation of connection context data and may comprise receiving data associated with a first network protocol and receiving data associated with a second network protocol. A single context memory may be shared and utilized for processing at least a portion of the data associated with the first network protocol and at least a portion of the data associated with the second network protocol. At least a portion of the received data associated with the first and/or second network protocols may be offloaded for processing using the single context memory. The received data associated with a first and/or second network protocols may comprise traffic data and control data. Portions of the shared single context memory may be dynamically allocated and/or reallocated for processing received data associated with the first and second network protocols.

The single context memory may be partitioned into a plurality of partitions, each of which may be allocated to handle data associated with each of the first and/or second network protocols. The partitions may be reallocated to handle data from different protocols. Reallocation of the partitions to handle data from different protocols may occur dynamically. For example, a partition allocated to handle the first network protocol may be subsequently reallocated to handle the second network protocol. The first network protocol and the second network protocol may comprise L2, L4, L5, RDMA and/or ISCSI data. A size of the single context memory is less than a combined size of separate memories that would be required to separately process each of the first network protocol and the second network protocol data.

Another embodiment of the invention may provide a machine-readable storage having stored thereon, a computer program having at least one code section executable by a machine for causing the machine to perform steps as described above for network interfacing and processing of packetized data.

Certain embodiments of the system may comprise at least one processor that receives data associated with a first network protocol and receives data associated with a second network protocol. A single shared context memory may be utilized by the processor to process at least a portion of the data associated with the first network protocol and at least a portion of the data associated with the second network protocol. The processor may offload at least a portion of the received data associated with the first and/or second network protocols for processing in the single context memory. The received data associated with a first and/or second network protocols may comprise traffic data and control data. Portions of the shared single context memory may be dynamically allocated and/or reallocated by the processor for processing received data associated with the first and second network protocols.

The processor may be adapted to partition the single context memory into a plurality of partitions, each of which may be allocated to handle data associated with each of the first and/or second network protocols. The processor may be configured to reallocate the partition in order to handle data from different protocols. In this regard, the processor may dynamically reallocate the partitions to handle data from different protocols. For example, a partition allocated to handle the first network protocol may be subsequently reallocated by the processor to handle the second network protocol. The first network protocol and the second network protocol may comprise L2, L4, L5, RDMA and/or ISCSI data. The single context memory may be configured so that its size is less than a combined size of separate memories that would be required to separately process each of the first network protocol and the second network protocol data.

Another embodiment of the invention may comprise allocating a first partition of a single context memory for handling data for a first network protocol connection. A second partition of the single context memory may be allocated for handling data for a second network protocol connection. Data for the first network protocol connection may be processed utilizing the first partition of the single context memory and data for the second network protocol connection may be processed utilizing the second partition of the single context memory. The method may further comprise de-allocating the first partition of the single context memory when the first network protocol connection terminates. At least a portion of the de-allocated first partition of the single context memory may be reallocated to process data for a third network protocol connection. An unallocated portion of the single context memory may be allocated to process data for a third network protocol connection. When the third network protocol connection terminates, the context memory allocated to process the third network protocol connection may be de-allocated and returned to a pool of available portion of the single context memory that may be available for allocation.

The second partition of the single context memory may also be de-allocated when the second network protocol connection terminates. At least a portion of the de-allocated second partition of the single context memory may be re-allocated to process data for a fourth network protocol connection. An unallocated portion of the single context memory may be allocated to process data for a fourth network protocol connection. When the fourth network protocol connection terminates, the context memory allocated to process the fourth network protocol connection may be de-allocated and returned to a pool of available portion of the single context memory that may be available for allocation.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing pooling or dynamic allocation of connection context data and may comprise receiving data associated with a first network protocol and receiving data associated with a second network protocol. A single context memory may be shared and utilized for processing at least a portion of the data associated with the first network protocol and at least a portion of the data associated with the second network protocol. At least a portion of the received data associated with the first and/or second network protocols may be offloaded for processing in the single context memory. The received data associated with a first and/or second network protocols may comprise traffic data and control data. Portions of the shared single context memory may be dynamically allocated and/or reallocated for processing received data associated with the first and second network protocols.

Some aspects of the present invention may be found in, for example, systems and methods that provide network interfaces. Some embodiments according to the present invention may provide systems and methods that combine networking functions. For example, in one embodiment according to the present invention, a common networking adapter, a storage adapter, an interprocess communication (IPC) or high performance computing (HPC) adapter and a management adapter may be combined into a single device. Substantial savings in cost and space may be achieved, for example, by time-division-multiplexing the resources of shared blocks or by dynamically allocating fixed resources between the different network types. Shared blocks may be developed that provide features (e.g., functions) applicable to one or more of the protocols. Shared blocks may also house special services that may not be used by all of the protocols.

Figure 1:
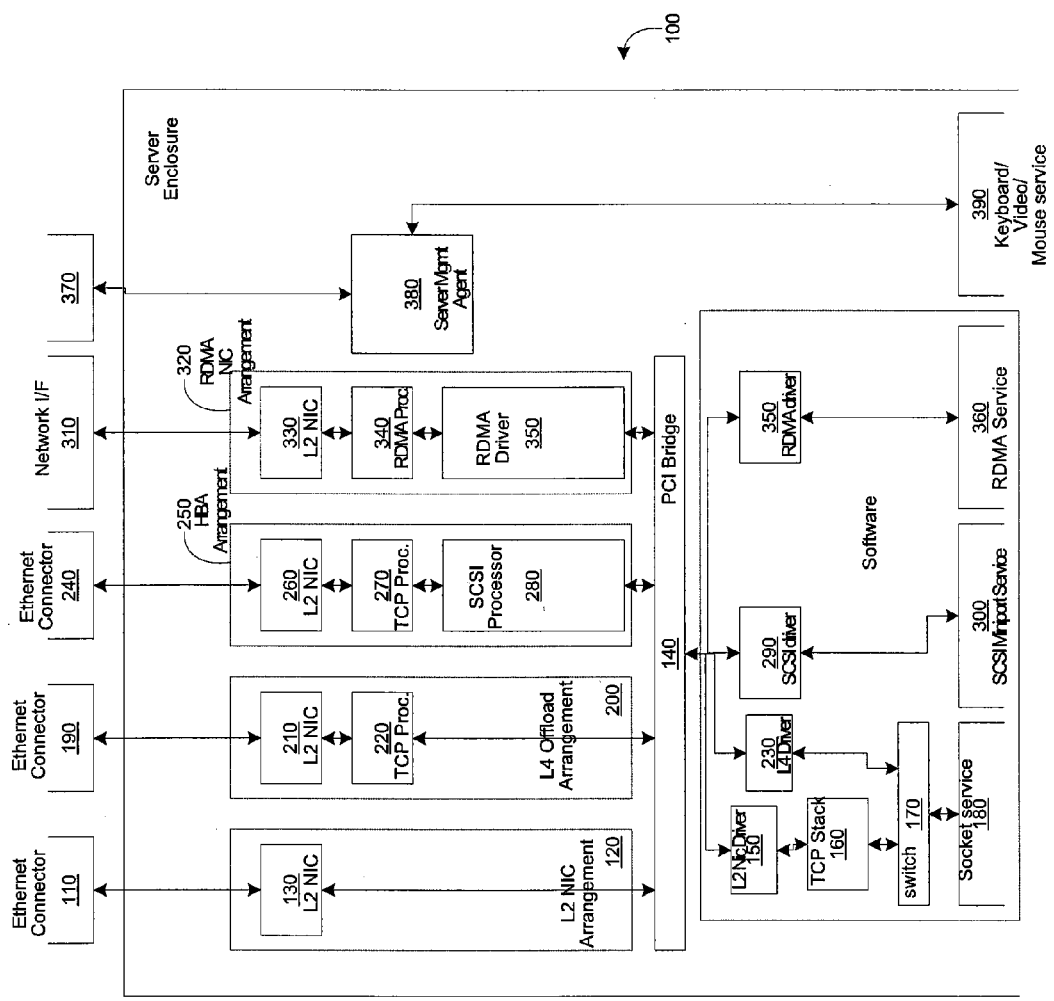
FIG. 1 shows a block representation illustrating an embodiment of a server.
Figure 2:
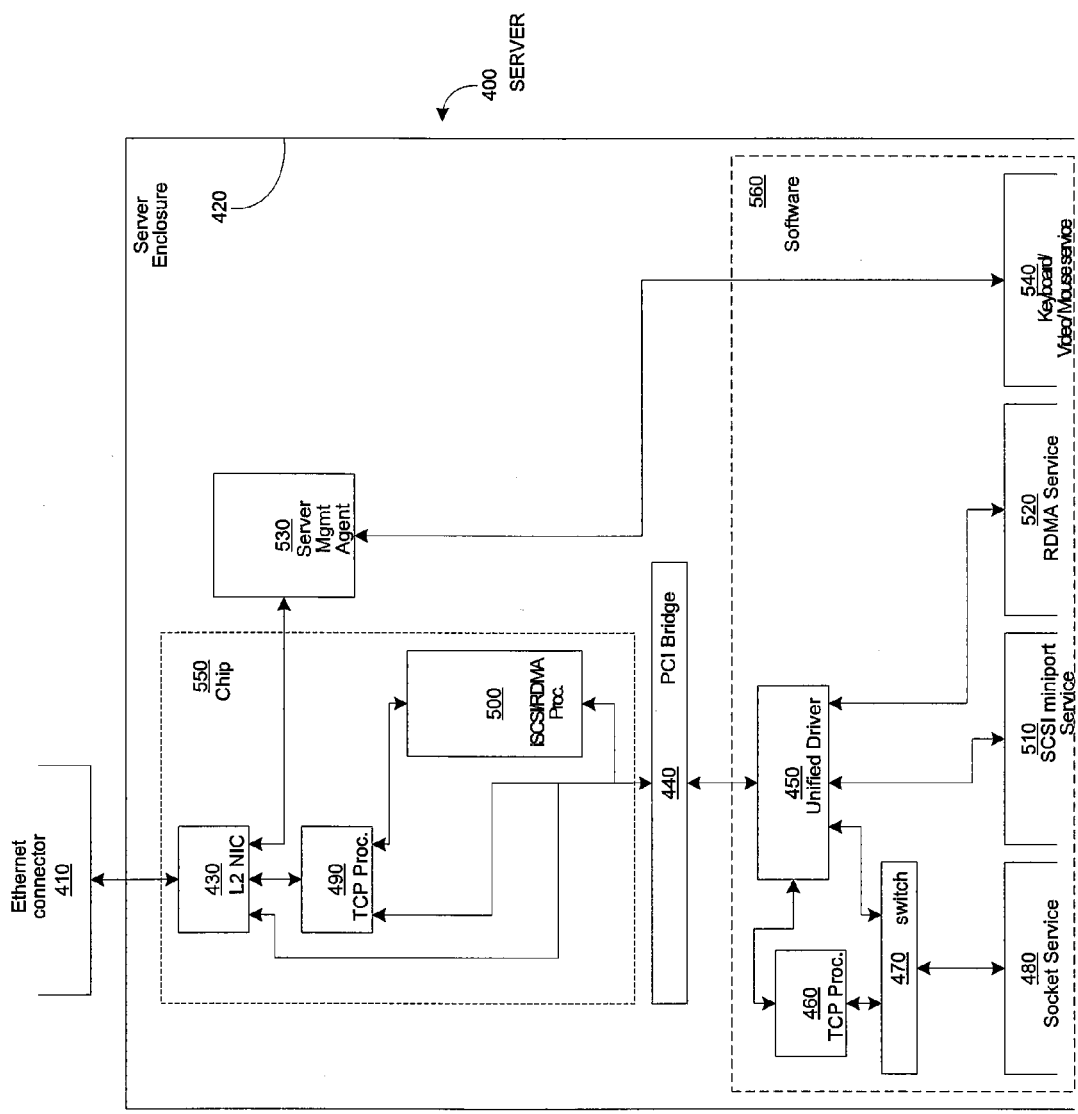
FIG. 2 shows a block representation illustrating an embodiment of a server according to the present invention.

FIG. 2 shows a block representation illustrating an embodiment of a server 400 according to the present invention. The server 400 may include, for example, an Ethernet connector 410 and a server enclosure 420. The present invention also contemplates using one or more Ethernet connectors 410. For example, additional Ethernet connectors 410 may be used to provide enhanced performance, fault tolerance or teaming. The server 400 may be adapted to handle a plurality of different networks via the one or more Ethernet connectors 410. As illustrated, in one embodiment according to the present invention, the server 400 may handle five different types of network traffic. However, the present invention also contemplates handling more or less than five different types of network traffic.

A first type of network traffic that the server 400 can handle may be, for example, common network traffic such as, for example, Ethernet network traffic employing, for example, Internet protocol (IP) technologies or other layer 3 (L3) technologies and transporting small amounts of data and control information around the network. The first type of network traffic may be handled by a first network traffic system that may include, for example, the Ethernet connector 410, a layer 2 (L2) network interface card (NIC) 430, a peripheral component interconnect (PCI) bridge 440, an unified driver 450, a software transmission control protocol (TCP) processor 460, a socket service switch 470 and a socket service 480. The Ethernet connector 410 may be coupled to the L2 NIC 430 which, in turn, may be coupled to the PCI bridge 440. The PCI bridge 440 may be coupled to the unified driver 450 which, in turn, may be coupled to the software TCP processor 460. The software TCP processor 460 may be coupled to the socket service switch 470 which, in turn, may be coupled to the socket service 480. The software TCP processor 460 may support, for example, socket services as well as other types of services.

A second type of network traffic that the server 400 can handle may be, for example, TCP accelerated traffic such as, for example, TCP running on top of IP. TCP over IP may be used to move large amounts of data across Ethernet networks. The server 400 may offload the TCP portion of the network traffic, thereby freeing server resources for running non-networking tasks. The second type of network traffic may be handled by a second network traffic system including, for example, a TCP offload engine (TOE) that can accelerate TCP traffic. The second network traffic system may include, for example, the Ethernet connector 410, the L2 NIC 430, a TCP processor 490, the PCI bridge 440, the unified driver 450, the socket service switch 470 and the socket service 480. The Ethernet connector 410 may be coupled to the L2 NIC 430 which, in turn, may be coupled to the TCP processor 490. The TCP processor 490 may be coupled to the PCI bridge which, in turn, may be coupled to the unified driver 450. The unified driver 450 may be coupled to the socket service switch 470 which, in turn, may be coupled to the socket service 480. The TCP accelerated traffic may be serviced by, for example, the socket service 480 or other types of services.

A third type of network traffic that the server 400 may handle may be, for example, storage traffic. The third type of network traffic may include, for example, a protocol (e.g., Internet SCSI (iSCSI)) that provides small computer system interface (SCSI) over a TCP/IP network. By using iSCSI, proprietary adapters may be avoided and storage traffic may run over a network shared by some or all of the different types of network traffic. The third type of network traffic may be handled by a third network traffic system that may include, for example, the Ethernet connector 410, the L2 NIC 430, the TCP processor 490, an iSCSI/remote-direct-memory access (RDMA) processor 500, the PCI bridge 440, the unified driver 450 and a SCSI miniport service 510. The Ethernet connector 410 may be coupled to the L2 NIC 430 which, in turn, may be coupled to the TCP processor 490. The TCP processor 490 may be coupled to the iSCSI/RDMA processor 500 which, in turn, may be coupled to the PCI bridge 440. The PCI bridge 440 may be coupled to the unified driver 450 which, in turn, may be coupled to the SCSI miniport service 510.

A fourth type of network traffic that the server 400 may handle may be, for example, IPC and HPC traffic. IPC networks may allow programs running on different servers to communicate quickly and without substantial overhead. IPC networks may be used with, for example, distributed applications, database servers and file servers. For example, IPC networks may be used when the requisite computing power exceeds the capacity of a particular server or when multiple servers are used for ultra-reliable operation. This type of service may be provided through an RDMA interface such as, for example, Winsock Direct or MPI or IT API or DAPL that may directly interface with applications. The fourth type of network traffic may be handled by a fourth network traffic system that may include, for example, the Ethernet connector 410, the L2 NIC 430, the TCP processor 490, the iSCSI/RDMA processor 500, the PCI bridge 440, the unified driver 450 and an RDMA service 520 (e.g., Winsock Direct). The Ethernet connector 410 may be coupled to the L2 NIC 430 which, in turn, may be coupled to the TCP processor 490. The TCP processor 490 may be coupled to the iSCSI/RDMA processor 500 which, in turn, may be coupled to the PCI bridge 440. The PCI bridge 440 may be coupled to the unified driver 450 which, in turn, may be coupled to the RDMA service 520.

A fifth type of network traffic that the server 400 may handle may be, for example, any traffic relating to any type of operating system (OS) Agnostic Management Entity or device. These entities or devices may monitor the state of the server 400 and may transmit information relating to state and statistical values over the network. The fifth type of network traffic may be handled by a fifth network traffic system that may include, for example, the Ethernet connector 410, the L2 NIC 430, a server management agent 530 and a keyboard/video/mouse service 540. The fifth network traffic system may provide keyboard, video and mouse hardware services to the server 400 so that these interfaces may be redirected over the network to a central server management system (not shown). The Ethernet connector 410 may be coupled to the L2 NIC 430 which, in turn, may be coupled to the server management agent 530. The server management agent 530 may be coupled to the keyboard/video/mouse service 540.

The present invention contemplates employing different levels of integration. For example, according to one embodiment of the present invention, a single integrated chip 550 may include, for example, one or more of the following: the L2 NIC 430, the TCP processor 490 and the iSCSI/RDMA processor 500. In another embodiment according to the present invention, software 560 may provide, for example, one or more of the following: the TCP processor 460, the socket service switch 470, the socket service 480, the unified driver 450, the SCSI miniport service 510, the RDMA service 520 and the keyboard/video/mouse service 540.

Figure 3:
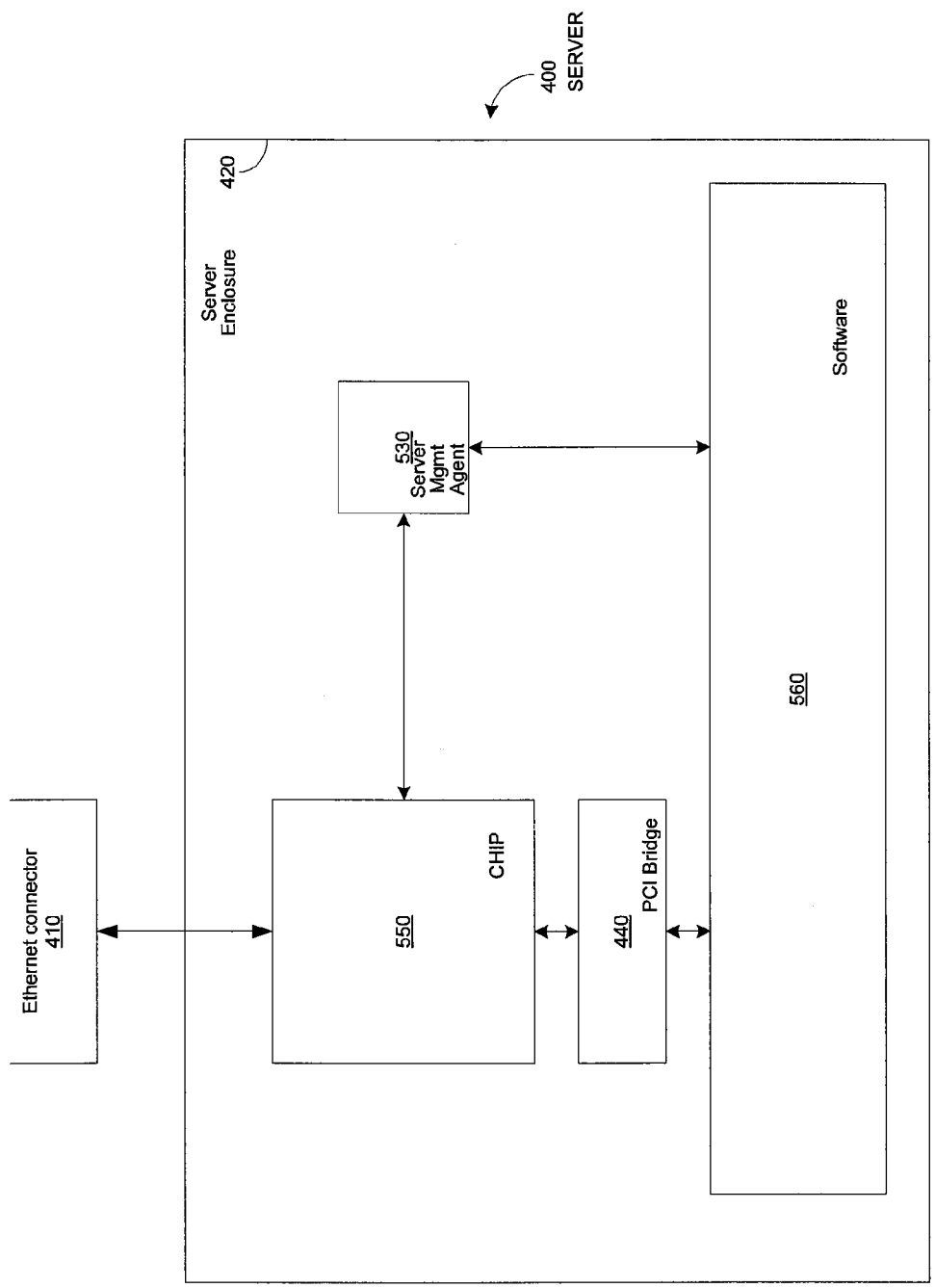
FIG. 3 shows a block representation illustrating an embodiment of a server according to the present invention.

FIG. 3 shows a block diagram illustrating the server 400 with some integrated components according to the present invention. In one embodiment according to the present invention, the server enclosure 420 houses the single integrated chip 550, the server management agent 530, the PCI bridge 440 and the software 560. The single integrated chip 550 may be coupled to the Ethernet connector 410, the PCI bridge 440 and the server management agent 530. The PCI bridge 440 and the server management agent 530 may each be coupled to the software 560. Thus, the single integrated chip 550 may handle, for example, five types of network traffic through a single Ethernet connector 410. The single integrated chip 550 or the PCI bridge 440 may determine which of the five types of network traffic may access the software 560 including the unified driver 450 and the various services 480, 510, 520 and 540. Access to the software 560 may be achieved via a number of different techniques including, for example, time division multiplexing and dynamically allocating fixed resources between the different network types.

Some embodiments according to the present invention may include one or more of the advantages as set forth below.

Some embodiments according to the present invention may employ a single Ethernet connector 410. Some embodiments may overcome a difficulty in that some operating systems insist that each connector for each type of traffic have a different driver. Furthermore, other embodiments may avoid the use of a layer 3 (L3) level switch which would be required to combine connections because input traffic would have to be sorted by IP address and sent only to the particular adapter with the particular IP address that might handle that particular traffic.

Some embodiments according to the present invention may provide a unified data path and control path. Such a unified approach may provide substantial cost and space savings through the integration of different components.

Some embodiments according to the present invention may share a TCP stack between the different types of network traffic systems. Cost savings may result from the elimination of redundant logic and code.

Some embodiments according to the present invention may share packet buffer memory. The network traffic systems may share the receive (RX) and the transmit (TX) buffer memory resources since the network traffic systems share a common Ethernet connection.

Some embodiments according to the present invention may share a direct memory access (DMA) engine and buffering technologies. Some of the network traffic systems and protocols may share buffering strategies and thus the logic for the mapping may be shared. Furthermore, since the DMA traffic may use a single Ethernet connection, buffering strategies may share the same DMA structure.

Some embodiments according to the present invention may have similar NIC-to-driver and driver-to-NIC strategies. By using a common technique for both directions of indication, cost may be saved over separate implementations.

Some embodiments according to the present invention may use a single IP address. By combining multiple networks and functions into a single NIC, a single IP address may be employed to serve them all. This may substantially reduce the number of IP addresses used in complex server systems and also may simplify the management and configurations of such systems.

Some embodiments according to the present invention may provide pooling and/or dynamic allocation of connection context data. The pooling of connection context between different protocols may allow substantial reductions in the storage space used and may make possible storing of connection context in a memory-on-a-chip implementation. The memory-on-a-chip implementation may remove, for example, the pins/power complexity associated with external memory. Similar considerations may also be applicable to SOC or ASIC-based applications. In this regard, reduced interface logic and pin count may be achieved.

Figure 4:
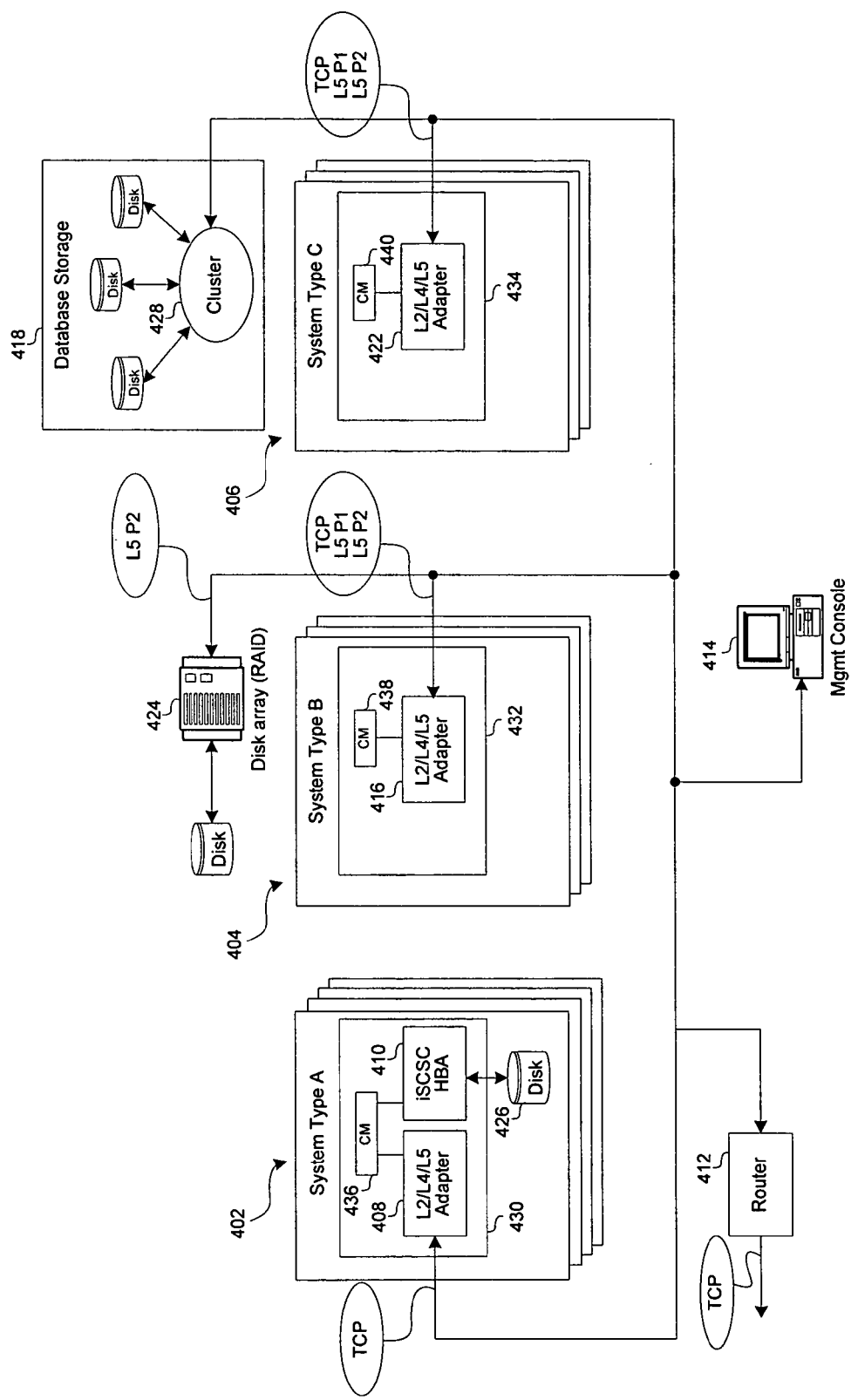
FIG. 4 is a block diagram of an exemplary data center that may be utilized in connection with providing pooling or dynamic allocation of connection context data in accordance with an embodiment of the invention.

FIG. 4 is a block diagram of an exemplary data center that may be utilized in connection with providing pooling or dynamic allocation of connection context data in accordance with an embodiment of the invention. For illustrative purposes, the exemplary data center of FIG. 4 is illustrated as a three-tier architecture. Notwithstanding, the invention is not so limited, but also contemplates architectures with more or less than three tiers. Referring to FIG. 4, a first tier 402 comprises a system of type A, a second tier 404 comprises a system of type B and a third tier 406 comprises a system of type C. In the first tier 402, there is shown a server 430 comprising a L2/L4/L5 adapter 408 and an SCSI host bus adapter (HBA) 410. A storage unit 426 such as a hard disk may be coupled to the SCSI HBA 410. In the second tier 404, there is shown a server 432 comprising a L2/L4/L5 adapter 416. In the third tier 406, there is shown a server 434 comprising a L2/L4/L5 adapter 422. Each of the servers 430, 432, 434 may comprise a single context memory (CM), namely, 436, 438, 440, respectively.

The data center of FIG. 4 may further comprise disk array 404, database storage 418, router 412 and management console 414. A storage unit such as a hard disk may be coupled to the disk array 424. The database storage 418 may comprise a cluster controller 428 and a plurality of storage units such as hard disks. Each of the storage units may be coupled to the cluster controller 428.

The type A system 402 may be adapted to process TCP data, while the type B system 404 and the type C system 406 may be adapted to process TCP data, layer 5 protocol 1 (L5 P1) data and layer 5 protocol 2 (L5 P2) data. For layer 5 protocol 1 (L5 P1), data may be transferred primarily between severs, for example, servers 431, 432, and 434. The layer 5 protocol 2 (L5 P2) data may be transferred to and stored in the disk array 424. The single L2/L4/L5 adapters 408, 416, 422 may be configured to handle, for example, network traffic, storage traffic, cluster traffic and management traffic. The single L2/L4/L5 adapters 408, 416, 422 may be integrated in, for example, a server blade. One consequence of using a single L2/L4/L5 adapter as a particular server or server blade, is that the particular server or server blade may be assigned a single IP address or 2 IP addresses one for storage traffic and one for other traffic types or 3 IP addresses one for storage traffic, one for management traffic and one for other traffic types, rather than having a plurality of processing adapters, each of which would require its own IP address. This may significantly reduce both hardware and software complexity.

The single context memory associated with each of the servers may be utilized for L2/L4/L5, RDMA, and iSCSI support and may comprise a plurality of differently partitioned sections. The use of a single context memory in each of the servers may be more cost effective and efficient than utilizing a plurality of separate memories for handling each of the L2/L4/L5, RDMA, and iSCSI protocols. This single context memory may be more readily integrated into, for example, in a system-on-chip (SOC) or other integrated circuit (IC), rather than utilizing the plurality of separate memories. With regards to memory size and memory usage, if each of the L2/L4/L5, RDMA, and iSCSI protocols utilized separate memories, then the adapter would require three (3) separate memories, each of which, in a worst case scenario, would be as large or almost as large as the single context memory provided in accordance with the various embodiments of the invention.

In this worst-case scenario, a conventional network interface adapter capable of separately handling each of the protocol context data, would require three (3) separate memories, each of which would be equivalent in size to the single context memory. To further illustrate this concept, assume that the single context memory has a size s, which is utilized to handle L2/L4/L5, RDMA and iSCSI protocols. In a conventional network interface adapter that is configured to handle L2/L4/L5, RDMA and iSCSI protocols, then three (3) separate memories each of size s would be required. In this regard, the conventional system would require 3s or three (3) times the size of the single context memory utilized in the invention. In this case, the conventional memory would require 3 separate memories for three different adapters, each of which has a corresponding controller configured to handle its own format. In accordance with the various embodiments of the invention, as illustrated in FIG. 2, a plurality of protocols are handled in a single controller and the protocols are compatible enough so that a single memory may be utilized to handle any one or any combination of protocols. This significantly reduces the amount of memory, when compared with combining 3 separate implementations in a single controller as utilized in conventional systems.

FIG. 4 also illustrates a converged network where all traffic is running on a single network. In one aspect of the invention, this may be implemented as separate dedicated networks. Notwithstanding, the first tier or tier one severs 402 may be adapted to accept requests from clients and in response, communicate formatted context back to the clients using, for example, TCP through the router 412. In addition to client communication, the tier one servers 402 also generate processing requests and receive corresponding processing results from the second tier servers 404 using, for example, TCP. The first tier sever 402 may access it's program on it's disk 426 via thee SCSI HBA 410.

The second tier severs 404 may communicate with the first tier servers 402 as previously stated, but also collect or update static context from, for example, the disk array 424 using L5 Protocol 1. The second tier servers 404 also request database operations and collect database results from the third tier servers 406 using L5 Protocol 2. The third tier severs 406 may communicate with the second tier servers 404 as previously stated, but also access the database storage using the cluster controller 428 using L5 protocol 1. The servers 430, 432, 434 may be managed using TCP connections to the management console 414.

Figure 5:
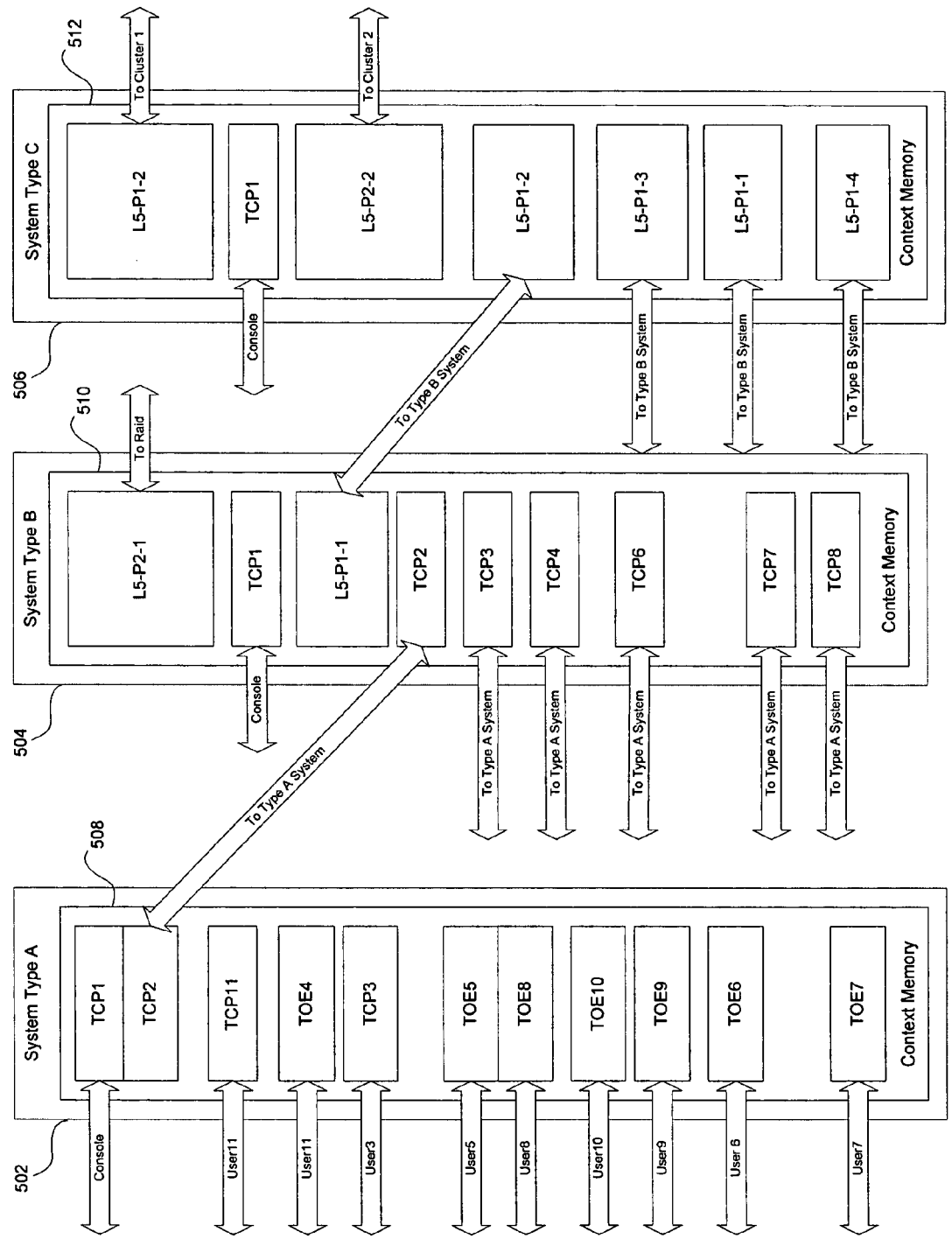
FIG. 5 is a block diagram illustrating exemplary partitioning of context memory required for supporting a plurality of combined protocols such as some of the protocols illustrated in FIG. 4, in accordance with an embodiment of the invention.

FIG. 5 is a block diagram illustrating exemplary partitioning of context memory required for supporting a plurality of combined protocols such as some of the protocols illustrated in FIG. 4, in accordance with an embodiment of the invention. Referring to FIG. 5, there is shown a system of type A 502, a system of type B 504 and a system of type C 506. The system of type A 502 comprises a single context memory 508, which comprises a plurality of partitions. The system of type B 504 comprises a single context memory 510 that also comprises a plurality of partitions. The system of type C 506 comprises a single context memory 512 that also comprises a plurality of partitions. Since the partitions associated with a particular context memory may be dynamically allocated and/or reallocated, the exemplary partitioning of FIG. 5 may be representative of a snapshot of the context memory at a particular time instant $t_1$. At a time instant $t_2$, where $t_2 > t_1$, the partitions of the context memory as illustrated may be differently allocated and/or de-allocated. Accordingly, a first new partition may be allocated to accommodate data for a new connection. However, when the first new partition is no longer needed, it may be de-allocated. For a second new connection, at least a portion of the first memory partition along with other unallocated context memory may be allocated and/or reallocated to handle the second new connection.

Each of the single context memories 502, 504, 506 may be partitioned and particular partitions may be utilized to process the combined L2, L4, RDMA, and iSCSI protocols. In this regard, for the system of type A 502, the single context memory 508 may be partitioned into the following partitions: TCP1, TCP2, TCP11, TOE4, TCP3, TOE5, TOE8, TOE10, TOE9, TOE6 and TOE7. For the system of type B 504, the single context memory 510 may be partitioned into the following partitions: L5-P2-1, TCP1, L5-P1-1, TCP2, TCP3, TCP4, TCP6, TCP7 and TCP8. For the system of type C 506, the single context memory 512 may be partitioned into the following partitions: L5-P2-1, TCP1, L5-P2-2, L5-P1-2, TCP3, TCP4, TCP6, TCP7 and TCP8. Each partition may be dynamically adapted to handle data associated with one of the combined protocols. The each partition and/or its size may be dynamically changed.

In an illustrative embodiment of the invention, L5-P2 context data may be associated with iSCSI protocol, L5-P1 context data may be associated with RDMA offload and TCP context data may be associated with L4 offload. Although L2/L4/L5, RDMA, and iSCSI protocols are illustrated, the invention is not limited in this regard, and other protocols may be utilized without departing from the scope of the invention. Notwithstanding; with reference to the system of type A 502, the TCP1 partition may be partitioned to handle data from a console such as the management console 414 in FIG. 4. The TCP11 partition may be partitioned to handle L4 offload data from a user connection, namely user11. The TOE4 partition may be partitioned to handle TOE data for the user 11 connection. The TCP3 partition may be partitioned to handle L4 offload data for user connection user3. The TOE5 partition may be partitioned to handle TOE data for user connection user5. The TOE8 partition may be partitioned to handle TOE data for user connection user8. The TOE10 partition may be partitioned to handle TOE data for user connection user10. The TOE6 partition may be partitioned to handle TOE data for user connection user6. The TOE7 partition may be partitioned to handle TOE data for user connection user7.

With reference to the system of type B 504, the L5-P2-1 partition may be partitioned to handle iSCSI data for the disk array connection such as the RAID 424. The TCP1 partition may be partitioned to handle L4 offload data from a console such as the management console 414 in FIG. 4. The L5-P1-1 partition may be partitioned to handle RDMA data for a connection. The TCP2 partition may be partitioned to handle L4 offload data for a connection with the type A system 502. The TCP3 partition may be partitioned to handle L4 offload data for a connection with the type A system 502. The TCP4 partition may be partitioned to handle L4 offload data for a connection with the type A system 502. The TCP6 partition may be partitioned to handle L4 offload data for a connection with the type A system 502. The TCP7 partition may be partitioned to handle L4 offload data for a connection with the type A system 502. The TCP8 partition may be partitioned to handle L4 offload data for a connection with the type A system 502.

With reference to the system of type C 506, the L5-P2-1 partition may be partitioned to handle iSCSI data for a first cluster controller connection. The TCP1 partition may be partitioned to handle L4 offload data from a console such as the management console 414 in FIG. 4. The L5-P2-2 partition may be partitioned to handle iSCSI data for a second cluster controller connection. The L5-P1-2 partition may be partitioned to handle RDMA data for a connection with the type B system 504. The L5-P1-3 partition may be partitioned to handle RDMA data for a third connection with the type B system 504. The L5-P1-1 partition may be partitioned to handle RDMA data for a first connection with the type B system 504. The L5-P1-4 partition may be partitioned to handle RDMA data for a fourth connection with the type B system 504.

TCP connections provide a smaller amount of offload and take a smaller amount of context storage than, for example, RDMA. The L5 protocol 1 is a RDMA protocol, which is used to communicate between applications running on different servers. Generally a medium number of these RDMA connections are needed and each RDMA connection provides a greater level of offload than TCP offload provides. Accordingly, a larger context storage area is needed than for TCP offload. The L5 protocol 2 is a storage protocol, which is utilized to communicate with disk arrays or clusters. Although few of these connections are needed, each of these L5 protocol 2 connections move a much larger amount of complex data. As a result, the L5 protocol 2 connections require an even larger context storage area.

One of the many advantages provided by the invention is that the distribution of the connection types complements the shared context model. The first tier server 402 has many connections due to it's connections with many client systems, but these TCP connections are smaller, so the context may hold any associated data. The second tier server 404 has smaller TCP connections only to the first tier servers 402, but has some of the larger protocol 1 connections to the database servers. This second tier may need just a few protocol 2 storage connections to access the static context. The third tier severs 406 have protocol 1 connections to the second their servers, but have may have more requirement for protocol 2 connections to the cluster controller. By supporting a mixture of connection types in the same context memory, a single type of adapter may be utilized in all three applications with similar memory requirements. If the same conventional solution is used with three types of severs, then the separate context memories must be sized to meet the requirements of all three applications, thereby resulting in much larger total memory.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for network interfacing and processing of packetized data, the method comprising:
   receiving context data associated with a first network protocol;
   receiving context data associated with a second network protocol that is different from said first network protocol; and
   sharing a single context memory partitioned for processing at least a portion of said context data associated with said first network protocol and at least a portion of said context data associated with said second network protocol.

2. The method according to claim 1, comprising offloading at least a portion of said received context data associated with said first network protocol for said processing within the single memory.

3. The method according to claim 1, comprising offloading at least a portion of said received context data associated with said second network protocol for said processing within the single memory.

4. The method according to claim 1, wherein said received context data associated with said first network protocol and said received context data associated with said second network protocol comprises traffic data and control data.

5. The method according to claim 1, comprising dynamically allocating portions of said shared single context memory for said processing.

6. The method according to claim 1, comprising partitioning said single context memory into a plurality of partitions.

7. The method according to claim 6, comprising allocating at least one of said plurality of partitions for handling context data for each of said first network protocol and said second network protocol.

8. The method according to claim 7, comprising dynamically reallocating at least one of said plurality of allocated partitions that handles said first network protocol to handle said second network protocol.

9. The method according to claim 8, wherein said first network protocol and said second network protocol comprises one or more of L2, L4, L5, RDMA and/or ISCSI data.

10. The method according to claim 8, wherein a size of said single context memory is less than a combined size of separate memories required for separately processing each of said first network protocol and said second network protocol.

11. A non-transitory machine-readable storage having stored thereon, a computer program having at least one code section for network interfacing and processing of packetized data, the at least one code section being executable by a machine for causing the machine to perform steps comprising:
receiving context data associated with a first network protocol;
receiving context data associated with a second network protocol that is different from said first network protocol; and
sharing a single context memory partitioned for processing at least a portion of said context data associated with said first network protocol and at least a portion of said context data associated with said second network protocol.

12. The non-transitory machine-readable storage according to claim 11, comprising code for offloading of at least a portion of said received context data associated with said first network protocol for said processing within the single memory.

13. The non-transitory machine-readable storage according to claim 11, comprising code for offloading at least a portion of said received context data associated with said second network protocol for said processing within the single memory.

14. The non-transitory machine-readable storage according to claim 11, wherein said received context data associated with said first network protocol and said received context data associated with said second network protocol comprises traffic data and control data.

15. The non-transitory machine-readable storage according to claim 11, comprising code for dynamically allocating portions of said shared single context memory for said processing.

16. The non-transitory machine-readable storage according to claim 11, comprising code for partitioning said single context memory into a plurality of partitions.

17. The non-transitory machine-readable storage according to claim 16, comprising code for allocating at least one of said plurality of partitions for handling context data for each of said first network protocol and said second network protocol.

18. The non-transitory machine-readable storage according to claim 17, comprising dynamically reallocating at least one of said plurality of allocated partitions that handles said first network protocol to handle said second network protocol.

19. The non-transitory machine-readable storage according to claim 18, wherein said first network protocol and said second network protocol comprises one or more of L2, L4, L5, RDMA and/or ISCSI data.

20. The non-transitory machine-readable storage according to claim 18, wherein a size of said single context memory is less than a combined size of separate memories required for separately processing each of said first network protocol and said second network protocol.

21. A system for network interfacing and processing of packetized data, the system comprising:
at least one processor that enables receiving of context data associated with a first network protocol;
said at least one processor enables receiving of context data associated with a second network protocol that is different from said first network protocol; and
a shared single context memory utilized by said at least one processor partitioned for processing at least a portion of said context data associated with said first network protocol and at least a portion of said context data associated with said second network protocol.

22. The system according to claim 21, wherein said at least one processor enables offloading of at least a portion of said received context data associated with said first network protocol for said processing within the single memory.

23. The system according to claim 21, wherein said at least one processor enables offloading of at least a portion of said received context data associated with said second network protocol for said processing within the single memory.

24. The system according to claim 21, wherein said received context data associated with said first network protocol and said received context data associated with said second network protocol comprises traffic data and control data.

25. The system according to claim 21, wherein said at least one processor enables dynamic allocation of portions of said shared single context memory for said processing.

26. The system according to claim 21, wherein said at least one processor enables partitioning of said single context memory into a plurality of partitions.

27. The system according to claim 26, wherein said at least one processor enables allocation of at least one of said plurality of partitions for handling context data for each of said first network protocol and said second network protocol.

28. The system according to claim 27, wherein said at least one processor enables dynamic reallocation of at least one of said plurality of allocated partitions that handles said first network protocol to handle said second network protocol.

29. The system according to claim 28, wherein said first network protocol and said second network protocol comprises one or more of L2, L4, L5, RDMA and/or ISCSI data.

30. The system according to claim 28, wherein a size of said single context memory is less than a combined size of separate memories required for separately processing each of said first network protocol and said second network protocol.

31. The system according to claim 28, wherein said at least one processor comprises one or both of a host processor and/or a NIC processor.

32. A method for processing of packetized data, the method comprising:
allocating a first partition of a single context memory for handling data for a first network protocol connection;
allocating a second partition of said single context memory for handling data for a second network protocol connection;
processing data for said first network protocol connection utilizing said first partition of said single context memory;
processing data for said second network protocol connection utilizing said second partition of said single context memory; and
de-allocating said first partition of said single context memory when said first network protocol connection is terminated.

33. The method according to claim 32, comprising reallocating at least a portion of said de-allocated first partition of said single context memory to process data for a third network protocol connection.

34. The method according to claim 33, comprising allocating an unallocated portion of said single context memory to process data for a third network protocol connection.

35. The method according to claim 32, comprising de-allocating said second partition of said single context memory when said second network protocol connection is terminated.

36. The method according to claim 35, comprising reallocating at least a portion of said de-allocated second partition of said single context memory to process data for a fourth network protocol connection.

37. The method according to claim 33, comprising allocating an unallocated portion of said single context memory to process data for a fourth network protocol connection.

38. A non-transitory machine-readable storage having stored thereon, a computer program having at least one code section for network interfacing and processing of packetized data, the at least one code section being executable by a machine for causing the machine to perform steps comprising:
    allocating a first partition of a single context memory for handling data for a first network protocol connection;
    allocating a second partition of said single context memory for handling data for a second network protocol connection;
    processing data for said first network protocol connection utilizing said first partition of said single context memory;
    processing data for said second network protocol connection utilizing said second partition of said single context memory; and
    de-allocating said first partition of said single context memory when said first network protocol connection is terminated.

39. The non-transitory machine-readable storage according to claim 38, comprising code for reallocating at least a portion of said de-allocated first partition of said single context memory to process data for a third network protocol connection.

40. The non-transitory machine-readable storage according to claim 39, comprising code for allocating an unallocated portion of said single context memory to process data for a third network protocol connection.

41. The non-transitory machine-readable storage according to claim 38, comprising code for de-allocating said second partition of said single context memory when said second network protocol connection is terminated.

42. The non-transitory machine-readable storage according to claim 41, comprising code for reallocating at least a portion of said de-allocated second partition of said single context memory to process data for a fourth network protocol connection.

43. The non-transitory machine-readable storage according to claim 39, comprising code for allocating an unallocated portion of said single context memory to process data for a fourth network protocol connection.

44. A system for processing of packetized data, the system comprising:
    at least one hardware processor that enables allocation of a first partition of a single context memory for handling data for a first network protocol connection;
    said at least one hardware processor enables allocation of a second partition of said single context memory for handling data for a second network protocol connection;
    said at least one hardware processor enables processing of data for said first network protocol connection utilizing said first partition of said single context memory;
    said at least one hardware processor enables processing of data for said second network protocol connection utilizing said second partition of said single context memory; and
    said at least hardware processor enables de-allocation of said first partition of said single context memory when said first network protocol connection is terminated.

45. The system according to claim 44, wherein said at least one hardware processor enables reallocation of at least a portion of said de-allocated first partition of said single context memory to process data for a third network protocol connection.

46. The system according to claim 45, wherein said at least one hardware processor enables allocation of an unallocated portion of said single context memory to process data for a third network protocol connection.

47. The system according to claim 44, wherein said at least one hardware processor enables de-allocation of said second partition of said single context memory when said second network protocol connection is terminated.

48. The system according to claim 47, wherein said at least one hardware processor enables reallocation of at least a portion of said de-allocated second partition of said single context memory to process data for a fourth network protocol connection.

49. The system according to claim 45, wherein said at least one hardware processor enables allocation of an unallocated portion of said single context memory to process data for a fourth network protocol connection.

* * * * *